United States Patent
Kleeberger et al.

(10) Patent No.: US 11,301,328 B2
(45) Date of Patent: Apr. 12, 2022

(54) METHOD FOR OPERATING A MICROCONTROLLER AND MICROCONTROLLER BY EXECUTING A PROCESS AGAIN WHEN THE PROCESS HAS NOT BEEN EXECUTED SUCCESSFULLY

(71) Applicant: Infineon Technologies AG, Neubiberg (DE)

(72) Inventors: Veit Kleeberger, Munich (DE); Rafael Zalman, Markt Schwaben (DE)

(73) Assignee: Infineon Technologies AG, Neubiberg (DE)

( * ) Notice: Subject to any disclaimer, the term of this patent is extended or adjusted under 35 U.S.C. 154(b) by 97 days.

(21) Appl. No.: 16/667,140

(22) Filed: Oct. 29, 2019

(65) Prior Publication Data
US 2020/0133803 A1 Apr. 30, 2020

(30) Foreign Application Priority Data
Oct. 30, 2018 (DE) .......................... 102018127082.8

(51) Int. Cl.
*G06F 11/14* (2006.01)
(52) U.S. Cl.
CPC ................................ *G06F 11/1407* (2013.01)
(58) Field of Classification Search
CPC ............ G06F 11/0796; G06F 11/1402; G06F 11/1405; G06F 11/1407; G06F 11/141; G06F 11/1471; G06F 11/497; G06F 2201/84
See application file for complete search history.

(56) References Cited

U.S. PATENT DOCUMENTS

| | | | | |
|---|---|---|---|---|
| 3,736,566 A | * | 5/1973 | Anderson | G06F 9/3863 714/15 |
| 4,566,063 A | * | 1/1986 | Zolnowsky | G06F 9/3861 711/125 |
| 4,740,969 A | * | 4/1988 | Fremont | G06F 11/1407 714/15 |
| 5,119,483 A | * | 6/1992 | Madden | G06F 9/26 707/999.009 |
| 5,568,380 A | * | 10/1996 | Brodnax | G01R 31/318533 700/79 |
| 6,363,501 B1 | | 3/2002 | Tobias et al. | |
| 7,467,325 B2 | * | 12/2008 | Eisen | G06F 9/30043 711/E12.021 |
| 8,365,015 B1 | * | 1/2013 | Yu | G06F 9/3863 714/16 |

(Continued)

OTHER PUBLICATIONS

R. Smith, et al., "Surviving Peripheral Failures in Embedded Systems", 14 pgs., Unisex Annual Technical Conference, Jul. 8-10, 2015.

*Primary Examiner* — Gabriel Chu
(74) *Attorney, Agent, or Firm* — Banner & Witcoff, Ltd.

(57) ABSTRACT

A method for operating a microcontroller, which includes a processor and a peripheral circuit on a common chip, the method including initiating a process in the peripheral circuit, in the peripheral circuit generating recovery data, executing the process, checking whether the process has been executed successfully and, in the event that the check reveals that the process has not been executed successfully, generating recovered data from the recovery data, and executing the process again.

14 Claims, 6 Drawing Sheets

(56) References Cited

U.S. PATENT DOCUMENTS

| | | | |
|---|---|---|---|
| 2006/0101306 A1* | 5/2006 | Needham | G06F 11/1658 714/11 |
| 2009/0265504 A1* | 10/2009 | Klein | G06F 11/1438 711/100 |
| 2014/0136895 A1* | 5/2014 | Fleischer | G06F 11/14 714/17 |
| 2019/0018747 A1* | 1/2019 | Dong | G06F 11/1469 |

* cited by examiner

METHOD FOR OPERATING A MICROCONTROLLER AND MICROCONTROLLER BY EXECUTING A PROCESS AGAIN WHEN THE PROCESS HAS NOT BEEN EXECUTED SUCCESSFULLY

TECHNICAL FIELD

The disclosure relates to a method for operating a microcontroller and to a microcontroller.

BACKGROUND

Requirements for systems in the automotive sector are developing from a so-called failsafe system (which means that the system is configured in such a way that it can be switched to a safe state if an error occurs) to a so-called fail-operational system (which means that the system is configured in such a way that further operation is made possible despite an error which has occurred).

For a fail-operational system, constraints which relate to availability and/or reliability may be extremely important, since the fail-operational system naturally must not endanger safety of a user and/or of the system itself.

This situation also relates to microcontrollers which are used in order to implement such systems.

Modern technologies may exhibit an increase in error rates in relation to temporary (short-term) errors. The effect of this may be that the conventional failsafe procedure, which combines comprehensive error detection with switching to the safe state, is no longer usable or entails high costs, because expensive redundant systems are typically provided therefor.

In one conventional strategy, an error may be detected by means of a safety mechanism and reported to an application, whereby a reaction is relocated to a different software level. An improvement in availability of the system as a whole cannot, however, be achieved in this way since the procedure in which the error occurred is typically interrupted until a reaction is induced by the other software level.

In microcontrollers, in the event of errors in the peripheral (also referred to as the peripheral module or peripheral circuit; here, this means on-chip peripheral circuits, for example interfaces for communication or data interchange (for example input/output ports, I2S, I2C, USB, Ethernet, CAN, SPI, SQI, PMP), converters (for example ADC or DAC), graphics controllers, timers and many others) the following procedure is currently adopted using the safety measures explained above:

For short-term errors, mechanisms range from protection of communication by means of cyclic redundant codes (CRCs) to plausibility checks which use redundant channels.

In general, these solutions have the disadvantage that the errors in the peripheral circuit are merely detected and communicated to a further instance, which is capable of reacting to the detected error. In these configurations, the corresponding peripheral service is stopped after the error detection, at least until a decision is made by the further instance (which is usually formed by further software (for example superordinate, external to the peripheral circuit)) regarding further action, in particular regarding resumption of operation.

A reaction initiated by the further instance called by the error message may, for example, be a new attempt at a procedure (which means time redundancy) or, for example, switching to an alternative channel (which means spatial redundancy). However, all these types of reactions are expensive since they require additional operating time or significant extra area outlay, and they make the overall configuration of the system more complicated.

SUMMARY

In various exemplary embodiments, a method is provided which allows continuous operation of a peripheral circuit of a microcontroller even if an error occurs.

The peripheral circuit may in this case be referred to as "speculative", in a similar way to a term "speculative execution" which is common in connection with CPUs. Here, "speculative" relates to the fact that an attempt is made to carry out something (for example a calculation, a memory transaction or a hardware conversion by a peripheral circuit), without being sure that the outcome will be the expected outcome. This means that, in a case in which a task is not successfully completed by a peripheral circuit, a fallback option is provided in order to prevent a definitive error from occurring.

One advantage of various exemplary embodiments may be that, similarly as in the case of speculative execution in a CPU or a data memory, an entire procedural sequence is implemented by means of hardware, without a programming overhead having to be added. This mechanism will remain hidden from a user until a permanent error occurs.

In various exemplary embodiments, continuous operation of the peripheral circuit if an error occurs is made possible by automatically instigating recovery and another attempt, so that a procedure (in which the error occurred) may be completed successfully. In this case, more extensive interaction with a (superordinate) software side may be obviated, and configurations which only allow error detection may be avoided as far as possible.

In order to allow the recovery, in various exemplary embodiments, recovery data, which allow recovery of data that are relevant for the procedure, may be generated before a first attempt at the execution of the procedure.

In various exemplary embodiments, the generation of the recovery data may be carried out in such a way that only the data relevant for the procedure are the basis for the recovery data generated. In various exemplary embodiments, further data, for example all working data of the peripheral circuit, may be used in order to generate recovery data.

In various exemplary embodiments, an approach is provided for providing fail-operational peripheral modules. To this end, transactions for interaction with the peripheral module are provided. In this case, the peripheral module is made capable of resetting the peripheral circuit to a control point state in the event that an error is discovered. The transaction may thereupon be attempted once more, in order to overcome the error that occurred at the first attempt. If the transaction is still affected by error after the new attempt, the peripheral circuit changes to merely informing about the presence of an error (for example as described above).

BRIEF DESCRIPTION OF THE FIGURES

Exemplary embodiments of the disclosure are represented in the figures and will be explained in more detail below.

DETAILED DESCRIPTION

In the following detailed description, reference is made to the appended drawings, which form part of this description and in which specific embodiments, in which the details of the disclosure may be carried out, are shown for illustration. It is to be understood that other exemplary embodiments may be used, and structural or logical variations may be carried out, without departing from the protective scope of the present disclosure. It is to be understood that the features of the various exemplary embodiments described herein may be combined with one another, unless otherwise specifically indicated. The following detailed description is therefore not to be interpreted in a restrictive sense, and the protective scope of the present disclosure is defined by the appended claims.

In the scope of this description, terms such as "connected", "attached" or "coupled" are used to describe both direct and indirect connection, direct or indirect attachment and direct or indirect coupling. In the figures, elements which are identical or similar are provided with identical references, insofar as this is expedient.

Figure 1:
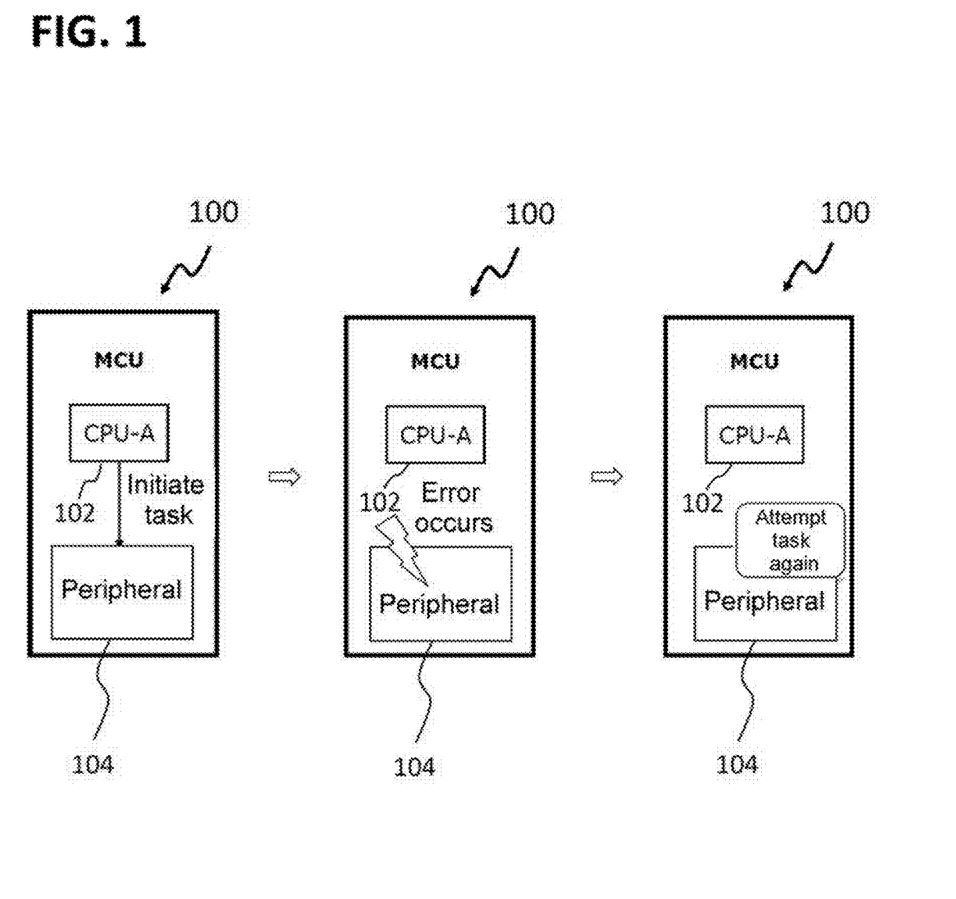
FIG. 1 shows a graphical illustration of a method for operating a microcontroller according to various exemplary embodiments.
Figure 2:
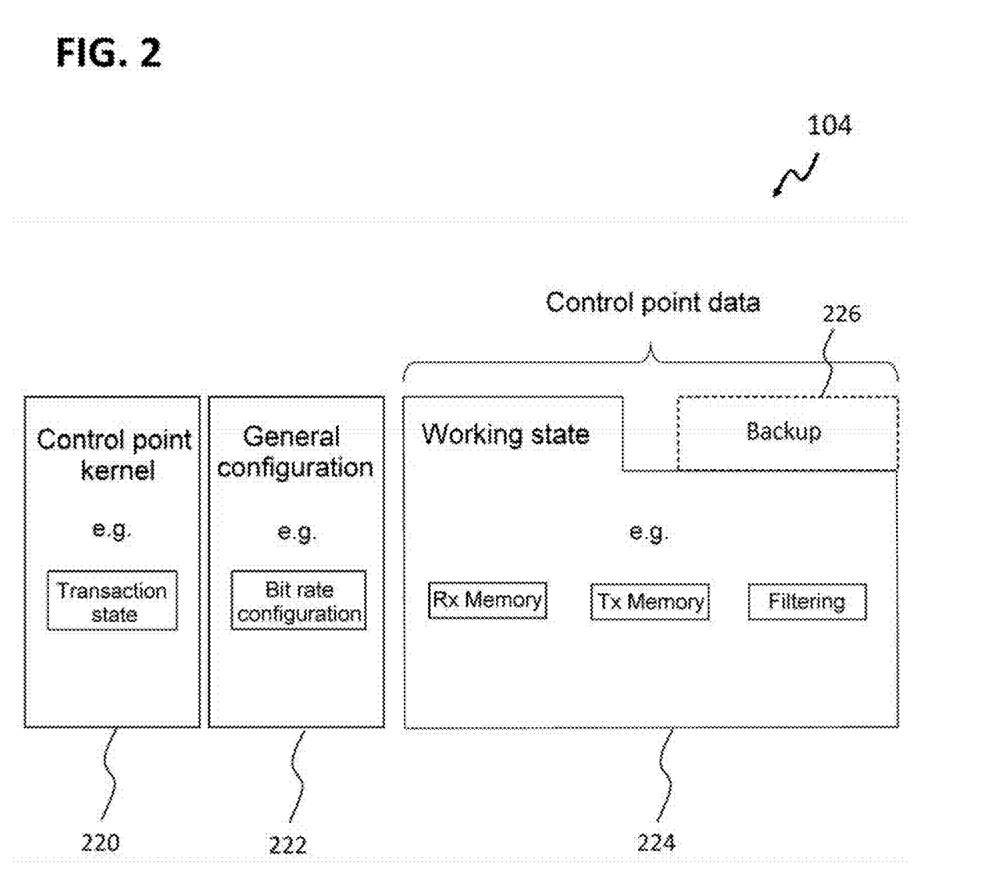
FIG. 2 shows a schematic representation of data in a peripheral circuit according to various exemplary embodiments.

FIG. 1 shows a graphical illustration of a method for operating a microcontroller 100 according to various exemplary embodiments, and FIG. 2 shows a schematic representation of data in a peripheral circuit 104 according to various exemplary embodiments.

In FIG. 1, the microcontroller 100 is represented at three different times. The microcontroller 100 may for example be a microcontroller 100 used in the automotive sector, or any other microcontroller which comprises a (micro)processor 102 and at least one peripheral circuit 104, in which case the processor 102 and the peripheral circuit 104 may be configured in such a way that they are integrated on or in the same chip.

As represented in FIG. 1 in the left diagram, the microcontroller 100 may be adapted to initiate, by means of its processor 102, a task (also referred to as a procedure, process or transaction) in the peripheral circuit 104. For example, the peripheral circuit 104 may be a communication interface and the processor 102 may provide the peripheral circuit with data to be sent, or the peripheral circuit 104 may be an analog-digital converter which provides the processor with data to be converted, or the like. The microcontroller 100 may be adapted to initiate the task in the peripheral circuit 104 other than by the processor 102, for example by a further peripheral circuit (not represented), for example a direct memory access (DMA) or by an initiated interrupt of a timer.

As represented in FIG. 1 in the central diagram, an error may occur in the peripheral circuit 104, for example a bit error caused by particle radiation or another spontaneously and randomly occurring error, for example in data to be processed or to be transmitted and/or in a finite state machine.

As represented in FIG. 1 in the right diagram, the peripheral circuit 104 may be adapted to attempt the task again after a failure.

To this end, as represented in FIG. 2, the peripheral circuit 104 may comprise an "original" peripheral circuit, which for example has a general configuration 222 (for example a bit rate configuration, etc.) and a working state 224 (for example data which are provided to memories e.g. for serial ports, for example Rx and/or Tx memories, or for example data which are provided for filtering). According to various exemplary embodiments, the peripheral circuit 104 may be extended by a special kernel 220, referred to as a control point kernel 220 (see FIG. 2) or "control point" logic 220 (see FIG. 4).

The control point kernel 220 may be adapted to execute or initiate tasks that are related to the new attempt at a task after a failure. For example, the control point kernel 220 may be adapted to generate recovery data 226, also referred to as a backup 226 or as safety data 226, and store them in the peripheral circuit 104. The recovery data 226 may, for example, comprise at least those data which are intended to be used for a task initiated in the peripheral circuit 104, also referred to as working state data 224. The working state data 224 may, for example, comprise data which are provided in an output data memory for a task by means of the peripheral circuit 104 as a communication interface, and/or data which are intended for conversion or filtering, and/or a state of a finite state machine, or the like.

The recovery data 226 may, in various exemplary embodiments, be formed as a direct copy of the working state data 224. In various exemplary embodiments, the recovery data 226 may be formed from the working state data 224, for example by means of adding an error correction code (ECC).

The working state data 224 and the recovery data 226 may, in various exemplary embodiments, together form control point data. This means that, in various exemplary embodiments, both types of data are present in the peripheral circuit 104, so that by means of the control point kernel 220, after a first execution attempt (for which the working state data are or have been used), it is possible to determine whether the task has been executed successfully and therefore, if required, i.e. when it is or has been determined that the task has not been carried out successfully, recovered (working state) data may be generated from the recovery data 226, or may be determined by means of the control point kernel 220, and may be used as the basis for a new attempt to execute the task.

Figure 3:
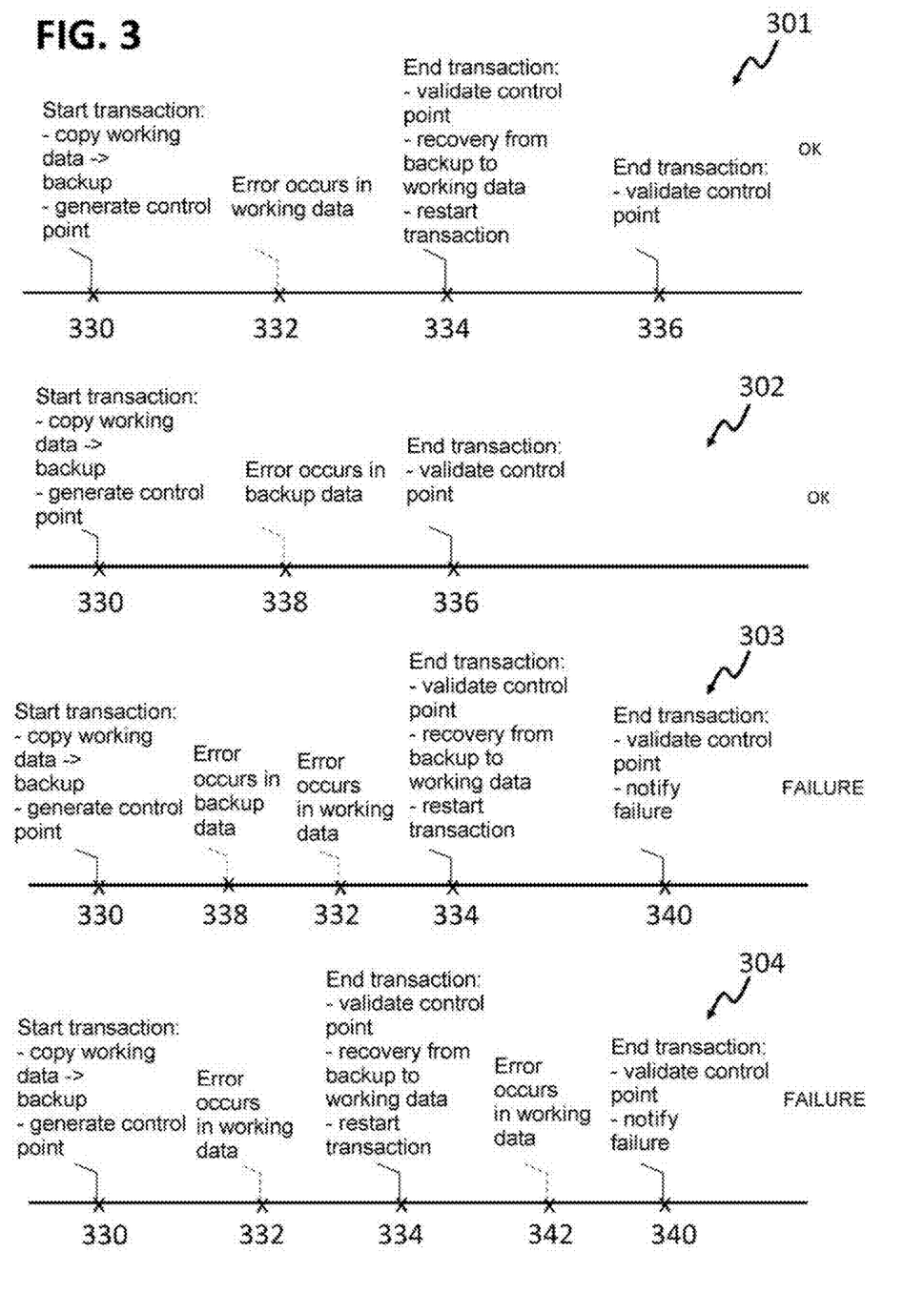
FIG. 3 shows a schematic illustration of four processes which are executed in a microcontroller according to various exemplary embodiments, particularly in a peripheral circuit of the microcontroller, and during the execution of which errors occur.

FIG. 3 shows a schematic illustration of four processes (respectively represented as a sequence of events in the views 301, 302, 303 and 304), which are executed in a microcontroller 100 according to various exemplary embodiments, particularly in a peripheral circuit 104 of the microcontroller 100, and during the execution of which errors occur.

As shown in view 301, at 330 a transaction is started (a task is initiated). The starting of the transaction may, in various exemplary embodiments, be carried out, as described above in connection with FIG. 1, by means of the processor 102, for example by an instruction being transmitted from the processor 102 to the peripheral circuit 104 and/or, for example, by data for further handling being transmitted to the peripheral circuit 104. In various exemplary embodiments, the initiation of the task may be carried out in another way, for example by means of a further peripheral circuit (for example by means of a direct memory access) or by means of an initiated interrupt of a timer. The start of the transaction may be the initiator for copying working data 224 into a backup. In other words, recovery data 226 may be generated from the working data 224.

Figure 4:
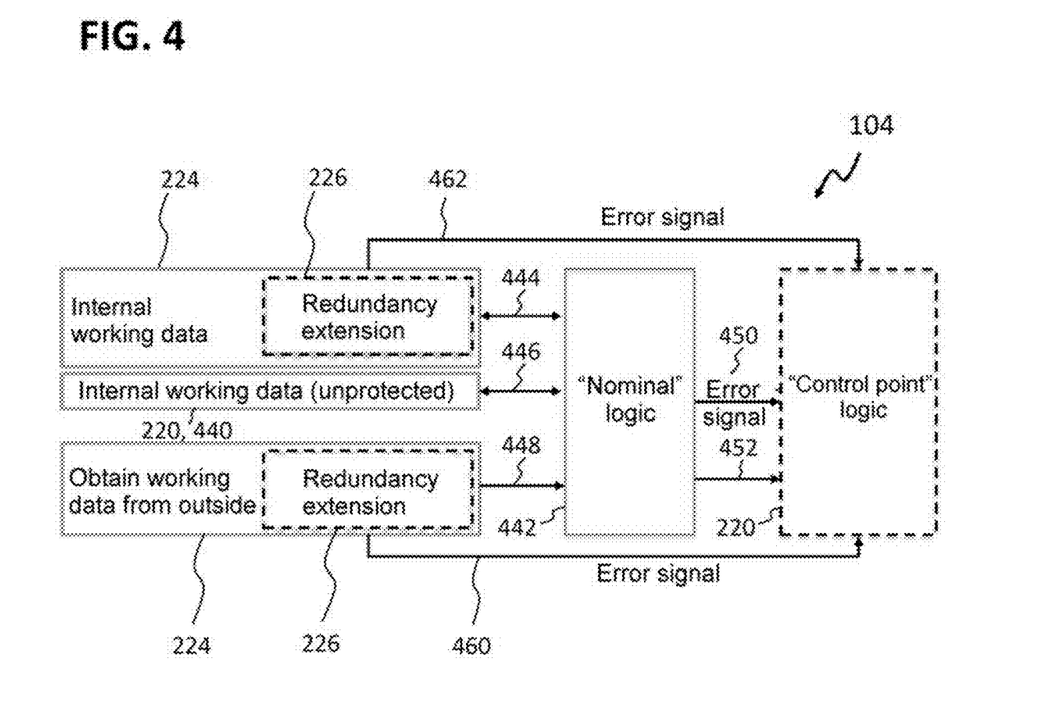
FIG. 4 shows a graphical illustration of a method for operating a microcontroller according to various exemplary embodiments.

FIG. 4 shows a graphical illustration of a method for operating a microcontroller 104 according to various exemplary embodiments, which shows in particular the handling of different data 224, 226, 440 in the peripheral circuit 104.

In FIG. 4, it is represented that the data 224, 226, 220, 440 stored in the peripheral circuit 104, for example in one or more data memories, have different properties or may partially be handled differently.

The working state data 224 described in connection with FIG. 2 may, for example, comprise internal working data 224 (for example a state of a finite state machine, a filter configuration or the like) and optionally (external) working data 224 supplied from outside the peripheral circuit 104, for example data to be transmitted or converted, or the like. Recovery data 226 (referred to in FIG. 4 as a "redundancy extension") may be provided both for the internal working data 224 and for the external working data 224. As described above, these may for example be generated as a direct copy of the underlying data, and/or may be protected by means of an error correction code as a redundancy extension in such a way that the underlying data (i.e. the internal or external working data 224) can be recovered without errors.

Unprotected data, for example unprotected internal working data 440 as represented in FIG. 4, may furthermore be stored in the peripheral circuit 104.

Figure 5:
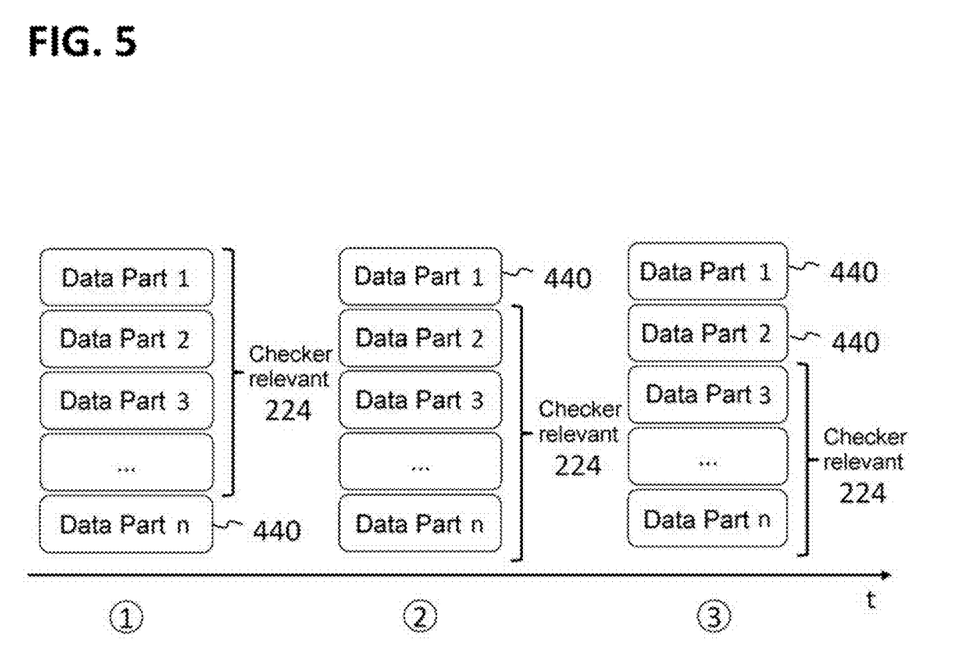
FIG. 5 shows a graphical illustration of a partial aspect of a method for operating a microcontroller according to various exemplary embodiments.

The unprotected internal working data 440 may, for example, relate to data that are not currently required for the execution of the task. One example of this is represented in FIG. 5. FIG. 5 is a graphical illustration of a partial aspect of a method for operating a microcontroller 100 according to various exemplary embodiments. In this case, a data packet 224 consisting of n parts in the peripheral circuit 104 is used (for example conditioned or processed) in such a way that, at each instant, only one or several of the n parts, or at least sometimes not all n parts, are used.

As shown in FIG. 5, at a first instant the $n^{th}$ part of the n parts of the data 224 is not used, so that a check is not relevant for this part. Accordingly, no recovery data 226 need to be generated for this part either, but for the other data parts they do. At a second instant, part 1 of the data 224 is not used, so that no recovery data 226 need to be generated for part 1. If they have already been generated at the first instant, they may optionally be overwritten when generating the recovery data 226 for the second instant, so that the memory area thereby freed may be used. Similarly, at a third instant, recovery data 226 may be generated only for data parts 3 to n. Even though FIG. 4 refers to the unprotected data 440 as internal working data, it is to be understood that the unprotected data 440 may also be formed by external working data.

In various exemplary embodiments, it may be advantageous to protect only the relevant part of the data by generating recovery data 226, since on the one hand this allows a faster processing time and, on the other hand, it reduces a memory area requirement for the recovery data 226.

By the identification of the relevant working state data 224 and their copying or protection in another way in order to form the recovery (backup) data 226, the control point is generated, as also explained in connection with FIG. 2.

At 332, an error occurs in the working data 224, for example a state affected by error in the finite state machine (FSM) and/or for example a bit error in data to be conditioned/processed.

At 334, the transaction is ended. The form in which validation of the control point is carried out may be dependent on the type of peripheral circuit 104. For example, the peripheral circuit 104 may be adapted to send data according to a predetermined protocol and may report a success in the event of successful preparation of the data according to the protocol rules and/or in the event of successful emptying of a data memory, and/or a receiver may send a confirmation of reception to the microcontroller 100, which may provide this to the peripheral circuit 104. Data to be converted may, for example, be formed in such a way that a check feature is created in the event of successful conversion, or the like.

If the validation of the control point (i.e. a check whether the process has been executed successfully) reveals that the process has not been executed successfully, in various exemplary embodiments recovered data may be generated from the recovery data 336. To this end, for example, the directly copied backup data 226 may be copied from the backup data memory into the memory for the working data 224, and/or the data may be recovered by means of the error correction information in the backup data memory and stored in the memory for the working data 224. This means that, for example, data for data transmission or data conversion may be recovered in their original state and/or that, for example, finite state machines are reset to their previous state.

Both the validation of the control point and the generation of the recovered data from the recovery data 226 may be carried out by means of the control point kernel 220. In other words, the control point kernel 220 may be adapted to check whether the process has been executed successfully and, in the event that the check reveals that the process has not been executed successfully, to initiate the recovery of the data from the recovery data 226 and a new attempt to execute the process (by using the recovered data).

Typically, when there is a spontaneously occurring temporary error (this type of error is also referred to as a "soft error"), a new attempt leads to success. This is illustrated in view 301 at 336, where at the end of the transaction the (new) validation of the control point, which may be carried out as described for 334, is successful, i.e. the process (the transaction) is evaluated as successfully completed.

A peripheral circuit 104 is therefore provided which is insensitive (or at least less sensitive) to this type of error.

In general, the determination of whether the transaction (the task/the process) has been completed successfully is dependent on the type of application which is involved, for example what type of peripheral circuit 104 is involved. For example, the determination of whether the transaction has been successfully completed is carried out in a different way for a peripheral circuit 104 that forms a communication interface than for a peripheral circuit 104 that forms an analog-digital converter. The determination may be carried out with software assistance or optionally with hardware assistance, for example by using error detection and/or error correction codes (EDC/ECC, for example a cyclic redundancy check (CRC)), by means of FSM-assisted error display, multiple execution of parts of the process, for example by a finite state machine being set several times (so that there is time redundancy) and/or using a plurality of (for example two) finite state machines (spatial redundancy).

As represented in FIG. 4, in various exemplary embodiments the error may be of such a type that the data 224 (or 226, as an expression of the fact that the data recovered from 226 during the repetition attempt are involved) themselves already lead to an error signal 460, or 462. This could, for example, be the case if the data themselves, as described above, are provided with an error detection/correction code.

In various exemplary embodiments, the error may be of such a type that the data 224 (or 226) (illustrated by the arrows 444, 446 and 448) are transferred to so-called "nominal logic" 442, for example a data converter, software for conditioning the data in such a way that they correspond to a communication protocol, or the like, and the error may not appear until during the processing there, whereupon an error signal 450 may be transmitted to the control point kernel 220. In other words, the peripheral circuit 104 may be adapted to provide an error signal, for example to the control point kernel 220, if an error occurs during the data processing. In various exemplary embodiments, processing/conditioning of the data by means of the "nominal logic" 442 may be carried out without errors and a corresponding message 452 may be provided (for example to the control point kernel 220).

In the event that the control point kernel 220 receives an error signal or generates one itself, it may be adapted, as described above, to initiate the recovery of the data (optionally after checking whether the maximum number of repetitions is reached, see the more detailed explanation below) and the new attempt to execute the process.

In various exemplary embodiments, the peripheral circuit 104, for example the control point kernel 220, may furthermore be adapted to check whether one or more recoveries have already been carried out. In order to avoid a continuous loop, which could for example be generated if there is a permanent error, a maximum number of repetition attempts may be specified. In this case, restriction of the number of repetition attempts to 1 may even be appropriate because, in some contexts, occurrence of two spontaneous errors in a short time interval may already be unlikely. A time window for the repetition attempt may, in various exemplary embodiments, in this case be established or determined in such a way that the likelihood of occurrence of a further error before the repetition attempt is small, for example less than 10%, for example less than 5%. In various exemplary embodiments, however, it may be appropriate to allow two or more repetition attempts if because of the operating circumstances it is to be expected that in a significant number of cases (for example at least 10%, for example at least 20%, for example at least 50%) only for example the second or third repetition attempt will lead to success.

With each repetition attempt, for example, a repetition counter in the control point kernel 220 may be incremented and compared with the predetermined maximum number of repetition attempts. The peripheral circuit 104, for example the control point kernel 220, may be adapted to initiate the recovery of the data from the recovery data 226 and the new attempt to execute the process only when the number of repetition attempts already carried out is less than the predetermined maximum number of repetition attempts.

In view 302, a process is illustrated which resembles that of view 301 and could in principle take place in the same microcontroller 100 (or peripheral circuit 104) as the process of view 301. In contrast to the process of view 301, the error in view 302 occurs not in the working data 224 but, at 338, instead in the backup data 226. The effect of this is that the validation of the control point is successful at the end of the transaction (at 336) since the working data 224, which were used during the first attempt to execute the process, are not affected by the error.

In view 303, a process similar to views 301 and 302 is in turn illustrated, which could take place using the same microcontroller 100 as for the processes at 301 and 302. The process of view 303 differs from the preceding ones in that two errors occur, one in the working data, one at 338 in the backup data 226 and one at 332 in the working data 224. Both errors occur between the generation of the backup (the recovery data) 226 and the recovery of the data from the recovery data 226. This means that the error in the working data, which is detected during the validation of the control point at 334, cannot be corrected by means of recovery of the data from the recovery data 226. Although the recovery and the restarting of the transaction are initiated (at 334), they do not lead to success because of the backup data affected by error, so that the validation of the control point at the end of the transaction (at 340) fails.

The peripheral circuit 104, for example the control point kernel 220, may be adapted to provide notification of the failure.

In various exemplary embodiments, the notification of the failure, which may for example be provided to the processor 102, may initiate conventional error handling, for example as described above in relation to the prior art. For example, in this case, superordinate software may be notified and adapted to decide about more extensive error handling or reactions while the processes in the peripheral circuit 104 are stopped.

In view 304, a process similar to views 301 and 302, and in particular view 303, is in turn illustrated, which could take place using the same microcontroller 100 as for the processes at 301, 302 and/or 303. The process of view 304 differs from the process of view 303 in that the two errors occurring relate to the working data 224, the first error (at 332) occurring before the recovery of the working data from the recovery data 226, and the second occurring, at 342, in the recovered data. If only one repetition is provided, at the end of the transaction (at 340), an error is determined during the validation of the control point and notification of a failure is provided, in a similar way as in the process of view 303. This may be followed by conventional error handling.

If more than one repetition is provided, for example in the case of a predetermined maximum number of repetitions of two or more, a new recovery may be carried out from the recovery data 226, followed by restarting of the transaction. In this way, the transaction may possibly still be completed successfully (not represented).

As may be seen with the aid of the exemplary embodiments of FIG. 3, views 303 and 304, there are therefore embodiments in which the execution of a process fails because of the occurrence of two errors ("soft errors"). In these cases, the microcontroller 100 may be adapted to proceed with the further error handling as in existing applications, i.e. for example with error reporting to software superordinate to the peripheral circuit 104 and subsequent error handling.

While traditional methods primarily concentrate on errors such as, for example, bit flips in data or finite state machines, the exemplary embodiments described are primarily aimed at a different type of error (for example in respect of whether data are consistent per se, or concerning a state of a finite state machine) or mistakes (for example unsent communication messages).

In various exemplary embodiments, the check whether the transaction has been completed successfully may be configured in such a way that it extends beyond a pure error check (for example by using safety flip-flops) to a superordinate level, for example by checking for errors or mistakes in relation to the transaction itself.

Availability may in this context be increased by not considering errors that do not interfere with the transaction.

Particularly in relation to automotive applications, for example in autonomous driving, "fail-operational" systems may be useful, in particular when the microcontroller satisfies the safety/ISO26262 requirements.

Figure 6:
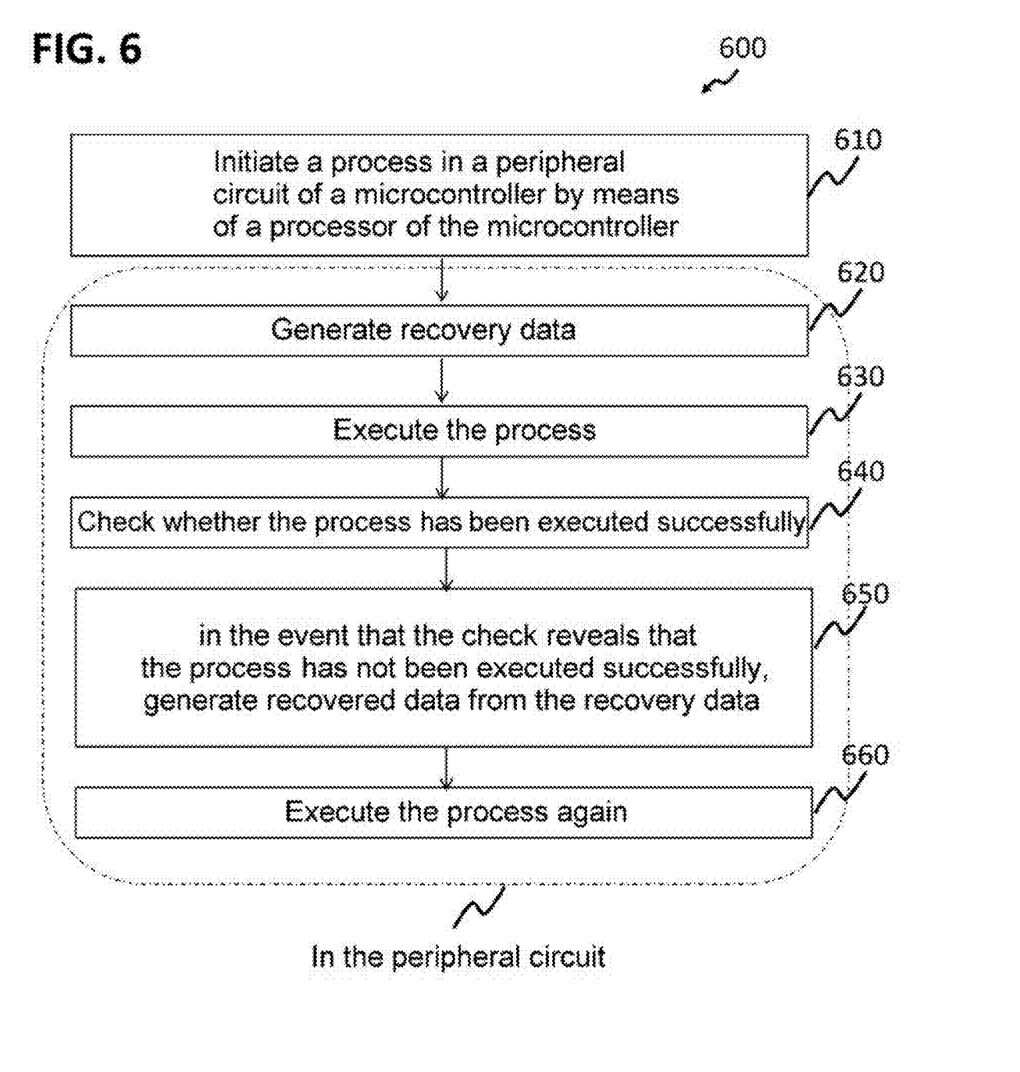
FIG. 6 shows a flowchart of a method for operating a microprocessor according to various exemplary embodiments.

FIG. 6 shows a flowchart 600 of a method for operating a microcontroller, which comprises a processor and a peripheral circuit on a common chip.

The method may comprise initiation of a process in the peripheral circuit by means of the processor (at 610).

The method may furthermore comprise, in the peripheral circuit, generation of recovery data (at 620), execution of the process (at 630), a check whether the process has been executed successfully (at 640) and, in the event that the check reveals that the process has not been executed successfully, generation of recovered data from the recovery data (at 650) and execution of the process again (at 660).

Some exemplary embodiments will be specified in brief below.

Exemplary embodiment 1 is a method for operating a microcontroller, which comprises a processor and a peripheral circuit on a common chip. The method may comprise initiating a process in the peripheral circuit, in the peripheral circuit generating recovery data, executing the process, checking whether the process has been executed successfully and, in the event that the check reveals that the process has not been executed successfully, generating recovered data from the recovery data, and executing the process again.

Exemplary embodiment 2 is a method according to exemplary embodiment 1, which furthermore comprises, after the process has been executed again, checking again whether the process has been executed successfully.

Exemplary embodiment 3 is a method according to exemplary embodiment 1 or 2, which furthermore comprises, before the generation of recovered data from the recovery data, determining a number of repetition attempts already carried out, the generation of recovered data from the recovery data and the execution of the process again taking place only if the number of repetition attempts already carried out is less than a predetermined maximum number of repetition attempts.

Exemplary embodiment 4 is a method according to exemplary embodiment 3, furthermore comprising, in the event that the new check reveals that the process has not been executed successfully and the number of repetition attempts already carried out is equal to the predetermined maximum number of repetition attempts, instigating an error handling process.

Exemplary embodiment 5 is a method according to one of exemplary embodiments 1 to 4, wherein the generation of recovery data comprises at least one of: generating a direct copy of at least a part of working data of the peripheral circuit; and generating an error correction code for at least a part of the working data of the peripheral circuit.

Exemplary embodiment 6 is a method according to exemplary embodiment 5, wherein a further part of the working data remains unprotected.

Exemplary embodiment 7 is a method according to exemplary embodiment 6, wherein the further part of the working data is not used when executing the process.

Exemplary embodiment 8 is a method according to exemplary embodiment 6 or 7, wherein the process comprises at least a first subprocess and a second subprocess, and wherein the part of the working data of the first subprocess is at least partially different to the part of the working data of the second subprocess, and the further part of the working data of the first subprocess is at least partially different to the further part of the working data of the second subprocess.

Exemplary embodiment 9 is a method according to one of exemplary embodiments 1 to 8, wherein the initiation of the process in the peripheral circuit is executed by means of the processor, by means of a further peripheral circuit or by means of an interrupt of a timer.

Exemplary embodiment 10 is a microcontroller, which comprises a processor and a peripheral circuit on a common chip, wherein the processor is adapted to initiate a process in the peripheral circuit, and wherein the peripheral circuit is adapted to generate recovery data, to execute the process, to check whether the process has been executed successfully, in the event that the check reveals that the process has not been executed successfully, to generate recovered data from the recovery data, and to execute the process again.

Exemplary embodiment 11 is a microcontroller according to exemplary embodiment 10, wherein the peripheral circuit is furthermore adapted, after the process has been executed again, to check again whether the process has been executed successfully.

Exemplary embodiment 12 is a microcontroller according to exemplary embodiment 10 or 11, wherein the peripheral circuit is furthermore adapted, before the generation of recovered data from the recovery data, to determine a number of repetition attempts already carried out, the peripheral circuit being adapted to carry out the generation of recovered data from the recovery data and the execution of the process again only if the number of repetition attempts already carried out is less than a predetermined maximum number of repetition attempts.

Exemplary embodiment 13 is a microcontroller according to exemplary embodiment 12, wherein the peripheral circuit is adapted, in the event that the new check reveals that the process has not been executed successfully and the number of repetition attempts already carried out is equal to the predetermined maximum number of repetition attempts, to instigate an error handling process.

Exemplary embodiment 14 is a microcontroller according to one of exemplary embodiments 10 to 13, wherein the peripheral circuit is adapted to carry out the generation of recovery data by means of generating a direct copy of at least a part of working data of the peripheral circuit, and/or generating an error correction code for at least a part of the working data of the peripheral circuit.

Exemplary embodiment 15 is a microcontroller according to exemplary embodiment 14, wherein a further part of the working data remains unprotected.

Exemplary embodiment 16 is a microcontroller according to exemplary embodiment 15, wherein the further part of the working data is not used when executing the process.

Exemplary embodiment 17 is a microcontroller according to exemplary embodiment 14 or 15, wherein the process comprises at least a first subprocess and a second subprocess, and wherein the part of the working data of the first subprocess is at least partially different to the part of the working data of the second subprocess, and the further part of the working data of the first subprocess is at least partially different to the further part of the working data of the second subprocess.

Exemplary embodiment 18 is a microcontroller according to one of exemplary embodiments 10 to 17, wherein the peripheral circuit forms a communication interface or a register.

Exemplary embodiment 19 is a microcontroller according to one of exemplary embodiments 10 to 18, wherein the microcontroller is adapted to initiate the process in such a way that the initiation of the process in the peripheral circuit is executed by means of the processor, by means of a further peripheral circuit or by means of an interrupt of a timer.

The invention claimed is:

1. A method for operating a microcontroller, which comprises a processor and a peripheral circuit on a common chip, the method comprising:
   initiating a process in the peripheral circuit;
   in the peripheral circuit:
      generating recovery data, wherein the generation of recovery data comprises at least one of:
         generating a direct copy of at least a part of working date of the peripheral circuit; and
         generating an error correction code for at least a part of the working data of the peripheral circuit,
         wherein a further part of the working data remains unprotected;
      executing the process;
      checking whether the process has been executed successfully;
      in the event that the check reveals that the process has not been executed successfully, generating recovered data from the recovery data; and
      executing the process again,
      wherein the process comprises at least a first subprocess and a second subprocess, a part of working data of the first subprocess is at least partially different from working data of the second subprocess, and a further part of the working data of the first subprocess is at least partially different to from a further part of the working data of the second subprocess.

2. The method as claimed in claim 1, further comprising:
   after the process has been executed again, checking again whether the process has been executed successfully.

3. The method as claimed in claim 1, further comprising:
   before the generation of recovered data from the recovery data, determining a number of repetition attempts already carried out, the generation of recovered data from the recovery data and the execution of the process again taking place only if the number of repetition attempts already carried out is less than a predetermined maximum number of repetition attempts.

4. The method as claimed in claim 3, further comprising:
   in the event that the new check reveals that the process has not been executed successfully and the number of repetition attempts already carried out is equal to the predetermined maximum number of repetition attempts, instigating an error handling process.

5. The method as claimed in claim 1,
   wherein the further part of the working data is not used when executing the process.

6. The method as claimed in claim 1,
   wherein the initiation of the process in the peripheral circuit is executed by way of the processor, by way of a further peripheral circuit, or by way of an interrupt of a timer.

7. A microcontroller, comprising, on a common chip:
   a processor; and
   a peripheral circuit,
   wherein the microcontroller is adapted to initiate a process in the peripheral circuit, and
   wherein the peripheral circuit is adapted to generate recovery data, to execute the process, to check whether the process has been executed successfully, and in the event that the check reveals that the process has not been executed successfully, to generate recovered data from the recovery data, and to execute the process again.
   wherein the peripheral circuit is adapted to carry out the generation of recovery data by way of:
      generating a direct copy of at least a part of working data of the peripheral circuit; or
      generating an error correction code for at least a part of the working data of the peripheral circuit, and
   wherein the process comprises at least a first subprocess and a second subprocess, wherein a part of working data of the first subprocess is at least partially different from a part of working data of the second subprocess, and a further part of working data of the first subprocess is at least partially different from a further part of working data of the second subprocess.

8. The microcontroller as claimed in claim 7,
   wherein the peripheral circuit is further adapted, after the process has been executed again, to check again whether the process has been executed successfully.

9. The microcontroller as claimed in claim 7,
   wherein the peripheral circuit is further adapted, before the generation of recovered data from the recovery data, to determine a number of repetition attempts already carried out, the peripheral circuit being adapted to carry out the generation of recovered data from the recovery data and the execution of the process again only if the number of repetition attempts already carried out is less than a predetermined maximum number of repetition attempts.

10. The microcontroller as claimed in claim 9,
    wherein the peripheral circuit is adapted, in the event that the new check reveals that the process has not been executed successfully and the number of repetition attempts already carried out is equal to the predetermined maximum number of repetition attempts, to instigate an error handling process.

11. The microcontroller as claimed in claim 7, wherein a further part of the working data remains unprotected.

12. The microcontroller as claimed in claim 11, wherein the further part of the working data is not used when executing the process.

13. The microcontroller as claimed in claim 7,
    wherein the peripheral circuit forms a communication interface or a register.

14. The microcontroller as claimed in claim 7,
    wherein the microcontroller is adapted to initiate the process in such a way that the initiation of the process in the peripheral circuit is executed by way of the processor, by way of a further peripheral circuit, or by way of an interrupt of a timer.

* * * * *